W. H. BARRIERE.
DIRECTION INDICATOR FOR AUTOMOBILES.
APPLICATION FILED JUNE 13, 1921.
1,397,672.
Patented Nov. 22, 1921.
2 SHEETS—SHEET 1.
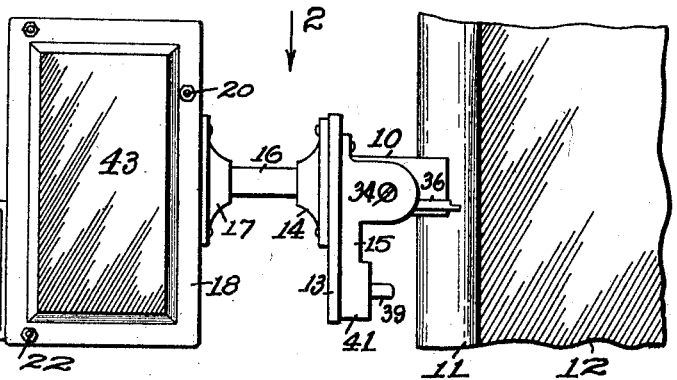
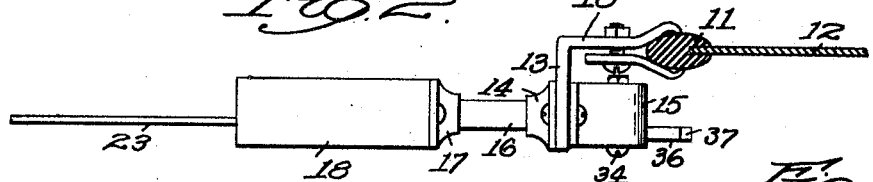
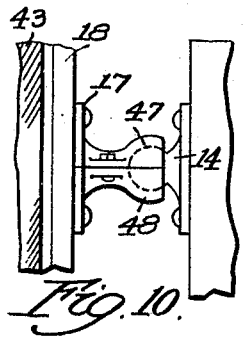
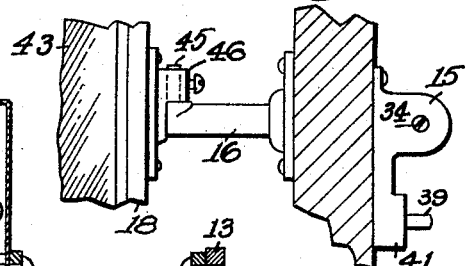
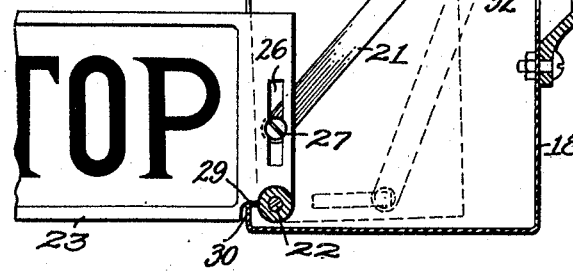

W. H. BARRIERE.
DIRECTION INDICATOR FOR AUTOMOBILES.
APPLICATION FILED JUNE 13, 1921.
1,397,672.
Patented Nov. 22, 1921.
2 SHEETS—SHEET 2.
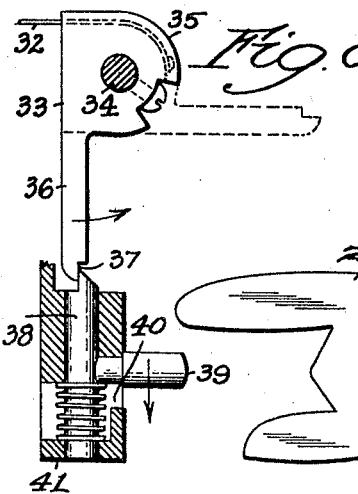
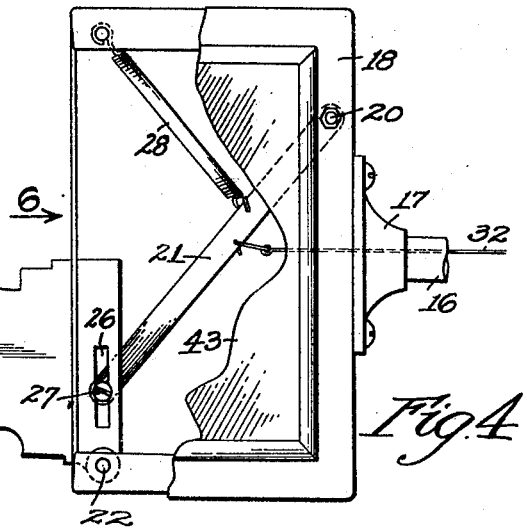
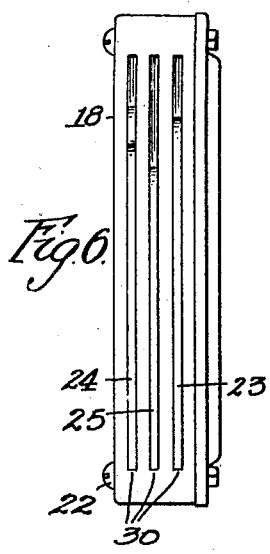
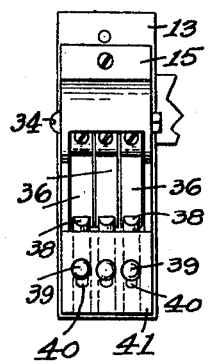
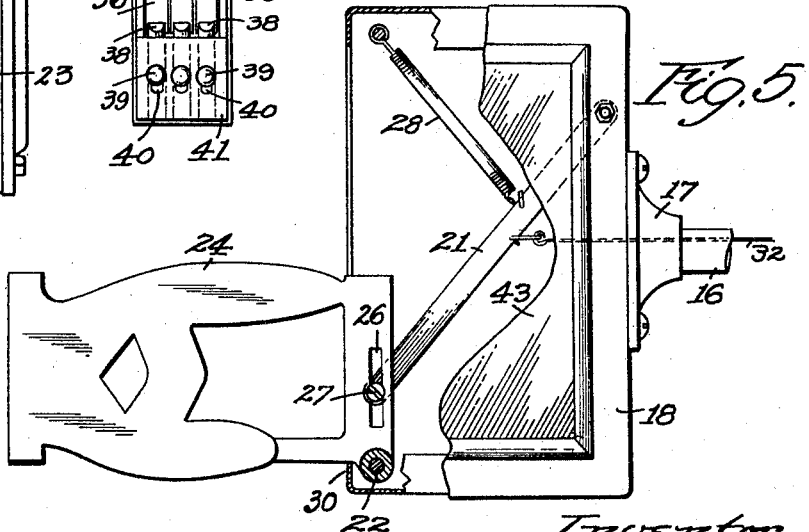

UNITED STATES PATENT OFFICE.

WILFRID H. BARRIERE, OF WORCESTER, MASSACHUSETTS.

DIRECTION-INDICATOR FOR AUTOMOBILES.

1,397,672.   Specification of Letters Patent.   Patented Nov. 22, 1921.

Application filed June 13, 1921.  Serial No. 477,330.

*To all whom it may concern:*

Be it known that I, WILFRID H. BARRIERE, a citizen of the United States, residing at Worcester, in the county of Worcester and State of Massachusetts, have invented a new and useful Direction-Indicator for Automobiles, of which the following is a specification.

This invention relates to a device by which the driver of an automobile can indicate his intended actions in as simple a manner as possible. The principal objects of the invention are to provide a small and compact device adapted to be mounted on one corner post, mud shield or the like, and take up very little room for giving the desired signal; to provide it in such form that the signal can be displayed or withdrawn by a simple touch of the finger on a pin or button located in a convenient position; to provide a construction in which the parts are restored to normal undisplayed position in an equally simple manner; to provide a universal joint by which the angle of the device can be changed at will, and especially to provide an operating mechanism that will involve few parts and those of a very simple character. Further objects and advantages of the invention will appear hereinafter.

Reference is to be had to the accompanying drawings in which—

Figure 1 is a front elevation of a device constructed in accordance with this invention;

Fig. 2 is a plan of the same;

Fig. 3 is a longitudinal central sectional view on a vertical plane showing the interior structure;

Figs. 4 and 5 are front elevations showing two different signals that can be displayed in accordance with this invention;

Fig. 6 is an end elevation of the casing;

Fig. 7 is an elevation of the operating end of the supporting bracket;

Fig. 8 is a sectional view on an enlarged scale similar to Fig. 3 of a part of the operating mechanism showing it in retracted undisplayed position;

Fig. 9 is a front elevation showing a way of applying the invention to a corner post, and Fig. 10 is a similar view showing a universal joint that can be used in connection with it.

Referring first to the first eight figures, I provide a clamp 10 of ordinary construction by which the device can be clamped on the upright 11 of the wind shield 12. This clamp is bent at right angles to form a support 13. This is in the form of a plate to which are secured two sheet metal members 14 and 15, one on one side and one on the other, constituting in effect a casing for the operating parts.

On the member 14 there is a tube 16 extending outwardly in a direction transverse to the longitudinal dimension of the car. This tube has a cup shaped support 17 on the end like the member 14 to which is secured a second casing 18. This casing is provided with a pivot rod 20 near the top and rear on which are pivoted a plurality of levers 21. At the bottom the casing 18 is provided with another pivot rod 22 on which are pivoted the several signals 23, 24 and 25. These may be of any desired form or shape or may display any desired wording. I have indicated that the driver is going to the right or left and one of them as displaying the word "Stop."

Each of these display plates 23 is provided with an end slot 26 in which enters a stud 27 located on the end of one of the levers 21. Individual springs 28 normally pull these levers up as far as possible. It will be seen by reference to Figs. 3, 4 and 5 that whenever either of these signals is displayed the corresponding spring 28 acts on the lever 21 to force the stud 27 against the outer edge of the slot 26 and hold the signal out in horizontal position. Each display plate has a notch 29 resting on a projection 30 at the bottom of the casing constituting the bottom of the slot through which the signal passes.

I have shown each of the levers 21 as connected individually by a wire 32 or other flexible connection with an operating lever 33. In the present form, having shown three signals 23, 24 and 25, there are three of these levers 33 all mounted independently to swing on a shaft 34 located in the casing 15. Each of these levers comprises a main plate having a curved surface 35 on which the flexible connection 32 can be wound part way around, as indicated in full lines in Fig. 8. Each is provided with a handle 36 having a notch 37. On the plate 13 below are a corresponding number of spring pressed latches 38 adapted to engage in their respective notches 37 and hold the arms 36 down in the position shown in Fig. 7. In this position all the signals are drawn back into the box 18 and are not displayed. On each of the latches 37 there is a handle 39 operating in a vertical slot 40 in a small casing 41 located on the bottom of the plate 13.

When it is desired to display any one of the signals the corresponding handle 39 is depressed. This withdraws that latch 38 and the corresponding spring 28 pulls the wire 32 and turns the lever 33 into the position shown in full lines in Fig. 3 As soon as the signal has started to drop gravity will assist the spring 38 and pull it over into the horizontal position shown in Fig. 1. It will be understood, of course, that to withdraw the signal the proper handle 36 is pushed down and that on account of the sloping ends of this arm and the latch 38 it will be automatically latched in its lowermost vertical position when the signal is drawn fully back into the casing 18.

In the form shown in Fig. 9 a slight modification is shown in that the tube 16 is provided with an upwardly extending projection 45 received in a vertical socket 46 on the casing 18 so that this casing is detachably connected.

In the form shown in Fig. 10 another modification is illustrated in which the bracket 14 is provided with a spherical joint member 47 engaging a concave spherical member 48 constituting the other member of the joint and located on the bracket 17. The several wire connections 32 pass through this universal joint as the end of the member 47 is perforated and there is a passage through it as well as through the member 48. This permits of turning the signal to the desired angle within convenient limits.

On the front of the box 18 I have shown a mirror 43 but of course any other device can be used there so long as it conceals the signal plates inside.

Although I have described and illustrated only minor modifications of the principal form of the invention, I am aware of the fact that other changes can be made therein by any person skilled in the art without departing from the scope of the invention as expressed in the claims. Therefore, I do not wish to be limited to all the details of construction herein shown and described but what I do claim is:—

1. In an automobile signal device, the combination of a casing, a plurality of signal plates pivotally mounted in said casing on an axis near the outer edge thereof and at the bottom, each of said plates having a slot therethrough at the end located in vertical position when the plate is turned to horizontal position for displaying purposes, a lever connected with each of said plates through said slot and extending upwardly in the casing all of said levers being pivoted on a horizontal axis near the top and rear of the casing, and yielding means for forcing each lever outwardly and constantly tending to swing the respective plates over into position for display outside the casing.

2. In an automobile signal device, the combination of a casing, a plurality of signal plates pivotally mounted in said casing, each of said plates having a slot therethrough at the end, a lever connected with each of said plates through said slot, yielding means for forcing each lever outwardly and constantly tending to swing the respective plates over into position for display outside the casing, a flexible member connected with each lever, and a support for the casing comprising a tube through which said flexible members pass.

3. In an automobile signal device, the combination of a casing, a plurality of signal plates pivotally mounted in said casing, a lever connected with each of said plates and extending upwardly in the casing, all of said levers being pivoted on a horizontal axis near the top and rear of the casing, yielding means for forcing each lever outwardly and constantly tending to swing the respective plates over into position for display, a flexible member connected with each lever, a pivoted lever connected with each of said flexible connections and having a surface over which said flexible connections can be drawn by turning the last named lever to withdraw the other lever into a position to swing the signal plate up into the casing.

4. In an automobile signal device, the combination of a plurality of signal plates pivotally mounted, a lever connected with each of said plates, yielding means for forcing each lever outwardly and constantly tending to swing the respective plates over into position for display, a flexible member connected with each lever, a pivoted lever connected with each of said flexible connections and having a surface over which said flexible connections can be drawn by turning the lever to withdraw the first named lever into a position to swing the signal plate up, each of the last named levers having an arm with a notch on it adapted to assume a horizontal position when the corresponding signal plate is displayed and adapted to be turned down to vertical position for withdrawing the signal plate, and a spring pressed latch for engaging the notch and holding the second lever in the last named position.

5. In an automobile signal device, the combination of a casing, a plurality of signal plates pivotally mounted in said casing, a lever connected with each of said plates and extending upwardly in the casing, all of said levers being pivoted on a horizontal axis near the top and rear of the casing, a spring for forcing each lever outwardly and constantly tending to swing the respective plates over into position for display outside the casing, a flexible member connected with each lever, and a support for the casing comprising a tube through which said flexible members pass, said tube having a universal joint therein whereby said casing can be turned to different angles.

6. In an automobile signal device, the combination of a casing, a plurality of signal plates pivotally mounted in said casing on an axis near the outer edge thereof and at the bottom of said casing, each of said plates having a slot therethrough at the end located in vertical position when the plate is turned to horizontal position for displaying purposes, a lever connected with each of said plates through said slot and extending upwardly in the casing, all of said levers being pivoted on a horizontal axis near the top and rear of the casing, yielding means for forcing each lever outwardly and constantly tending to swing the respective plates over into position for display outside the casing, a flexible member connected with each lever, and a support for the casing comprising a tube through which said flexible members pass, said tube being provided with means for detachably supporting said casing.

In testimony whereof I have hereunto affixed my signature.

WILFRID H. BARRIERE.